United States Patent
Kundu et al.

(10) Patent No.: US 10,970,490 B2
(45) Date of Patent: Apr. 6, 2021

(54) AUTOMATIC EVALUATION OF ARTIFICIAL INTELLIGENCE-BASED PROCESSES

(71) Applicant: INTERNATIONAL BUSINESS MACHINES CORPORATION, Armonk, NY (US)

(72) Inventors: Saubhik Kundu, Kolkata (IN); Rajesh Barri, Srikakulam (IN); Vivek R. Pratap, Bangalore (IN); Rishi Arora, Bangalore (IN); Saugata Das, Bangalore (IN); Tarannum M. Landge, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/413,894

(22) Filed: May 16, 2019

(65) Prior Publication Data

US 2020/0364304 A1 Nov. 19, 2020

(51) Int. Cl.
*G06F 17/27* (2006.01)
*G06F 40/30* (2020.01)
(Continued)

(52) U.S. Cl.
CPC ............ *G06F 40/30* (2020.01); *G06F 40/247* (2020.01); *G06F 40/253* (2020.01); *G06F 40/284* (2020.01); *G06N 20/00* (2019.01)

(58) Field of Classification Search
CPC ...... G06F 40/30; G06F 40/247; G06F 40/253; G06F 40/284; G06N 20/00
(Continued)

(56) References Cited

U.S. PATENT DOCUMENTS 5,920,836 A * 7/1999 Gould ..................... G10L 15/18
704/251
5,960,394 A * 9/1999 Gould ..................... G10L 15/18
704/270.1
(Continued)

FOREIGN PATENT DOCUMENTS

WO WO2015027079 A1 2/2015

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
(Continued)

*Primary Examiner* — Khai N. Nguyen
(74) *Attorney, Agent, or Firm* — Michael A. Petrocelli, Esq.; Kevin P. Radigan, Esq.; Heslin Rothenberg Farley & Mesiti P.C.

(57) ABSTRACT

A conversation for simulation by an artificial intelligence-based tutor is automatically generated. The conversation relates to content on which the artificial intelligence-based tutor is being trained. The automatically generating the conversation includes automatically generating inputs from a simulated student regarding the content, and automatically generating on behalf of the artificial intelligence-based tutor expected responses to the inputs generated from the simulated student. The conversation is provided as an output to be input to the artificial intelligence-based tutor for simulation by the artificial intelligence-based tutor.

17 Claims, 8 Drawing Sheets

(51) Int. Cl.
  *G06N 20/00* (2019.01)
  *G06F 40/247* (2020.01)
  *G06F 40/253* (2020.01)
  *G06F 40/284* (2020.01)

(58) Field of Classification Search
  USPC .......................................................... 704/9
  See application file for complete search history.

(56) References Cited

U.S. PATENT DOCUMENTS

| | | | | |
|---|---|---|---|---|
| 6,026,386 | A * | 2/2000 | Lannert | G09B 7/04 |
| | | | | 706/11 |
| 6,259,969 | B1 | 7/2001 | Tackett et al. | |
| 7,778,948 | B2 * | 8/2010 | Johnson | G09B 7/02 |
| | | | | 706/45 |
| 10,068,490 | B2 * | 9/2018 | Hibbs | A61B 5/7267 |
| 2007/0206017 | A1 * | 9/2007 | Johnson | G09B 7/04 |
| | | | | 345/473 |
| 2014/0335497 | A1 * | 11/2014 | Gal | G09B 5/08 |
| | | | | 434/323 |
| 2015/0010893 | A1 * | 1/2015 | Ritter | G09B 7/08 |
| | | | | 434/350 |
| 2016/0203726 | A1 * | 7/2016 | Hibbs | G09B 5/06 |
| | | | | 434/308 |
| 2017/0173466 | A1 * | 6/2017 | Fahmie | A63F 13/30 |
| 2019/0198011 | A1 * | 6/2019 | Kerr | G06N 20/00 |
| 2020/0159836 | A1 * | 5/2020 | Alkan | G06N 3/006 |

OTHER PUBLICATIONS

Shi, Genghu, et al., "Exploring an Intelligent Tutoring System as a Conversation-Based Assessment Tool for Reading Comprehension," SpringerLink, Oct. 2018, vol. 45, Issue 2, downloaded from https://link.springer.com/article/10-1007/s41237-0018-0065-9, Feb. 2, 2019, pp. 1/28-28/28.

* cited by examiner

AUTOMATIC EVALUATION OF ARTIFICIAL INTELLIGENCE-BASED PROCESSES

BACKGROUND

One or more aspects relate, in general, to computer technology, and in particular, to employing artificial intelligence.

Artificial intelligence (AI) is a branch of computer science that relates to the simulation of intelligent behavior in computers. It is intelligence demonstrated by machines. A device that includes artificial intelligence is able to mimic cognitive functions. It perceives its environment, takes actions, learns from experience and/or adjusts to new inputs.

Many processes, such as services, tasks, functions, aspects and/or other processes, employ artificial intelligence. One particular example of an artificial intelligence-based process includes educational services, such as an artificial intelligence-based tutor.

SUMMARY

Shortcomings of the prior art are overcome, and additional advantages are provided through the provision of a computer-implemented method. The method includes automatically generating a conversation for simulation by an artificial intelligence-based tutor. The conversation is regarding content on which the artificial intelligence-based tutor is being trained. The automatically generating the conversation includes automatically generating inputs from a simulated student regarding the content, and automatically generating on behalf of the artificial intelligence-based tutor expected responses to the inputs automatically generated from the simulated student. The conversation is provided as an output to be input to the artificial intelligence-based tutor for simulation by the artificial intelligence-based tutor.

Systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
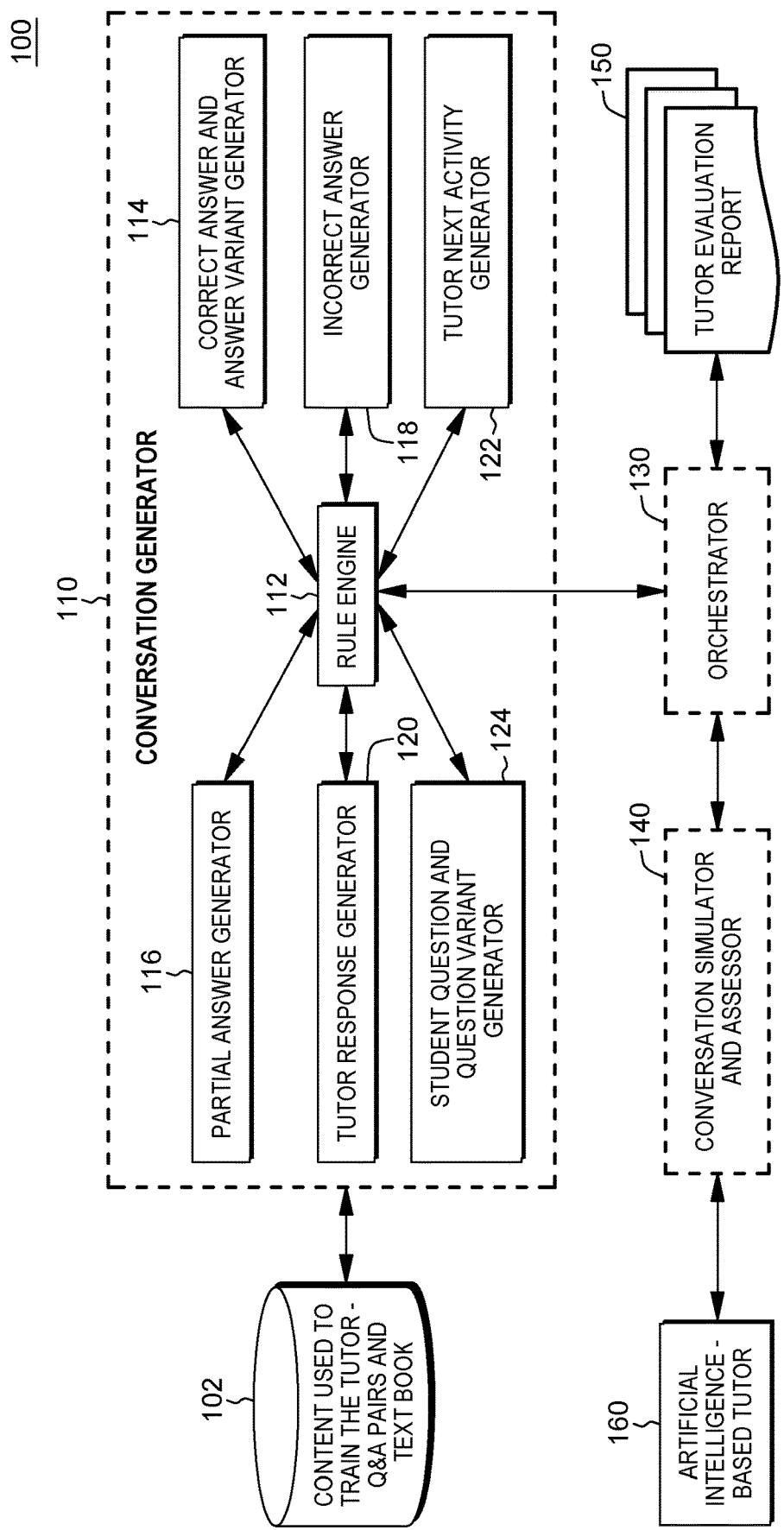
FIG. 1 depicts one example of an evaluation system used to evaluate an artificial intelligence-based process, such as an artificial intelligence-based tutor, in accordance with an aspect of the present invention.

In accordance with one or more aspects, an evaluation capability is provided that automatically and dynamically evaluates artificial intelligence-based processes, such as an educational service. In one particular example, the evaluation capability is used to evaluate an artificial intelligence-based tutor, including but not limited to, the IBM Watson® Tutor. IBM and IBM Watson are trademarks or registered trademarks of International Business Machines Corporation in at least one jurisdiction. Other names used herein may be registered trademarks, trademarks or product names of International Business Machines Corporation or other companies.

In one example, the artificial intelligence-based tutor (referred to herein as a tutor) is a virtual tutor (non-human) used for education (e.g., different levels of education, including higher education), which is realistic and assists students (e.g., human and non-human, such as simulated students) with their learning by explaining concepts through natural language. The tutor is, e.g., multi-nodal and communicates, for instance, through text-based dialogue. Further, the tutor is capable of grouping similar concepts, filling in the blanks, recommending similar questions, etc. The tutor is trained on a piece of content against which it is to be evaluated thoroughly.

Prior to students (e.g., human students) interacting with the artificial intelligence-based tutor for a selected topic (and/or as an on-going process), the artificial intelligence-based tutor is trained and/or evaluated, in accordance with one or more aspects of the present invention. This includes, for instance, traversing through different possible combinations of dialogues and flows. In accordance with an aspect of the present invention, the different possible combinations of dialogues and flows are automatically generated using, for instance, an evaluator. For instance, a conversation is automatically generated for simulation by an artificial intelligence-based tutor. The automatically generated conversation asks one or more simulated students questions related to a selected topic and automatically generates expected student responses. Based on those responses, expected responses on behalf of the artificial intelligence-based tutor are generated. For instance, a determination is made of the next questions to ask and/or of other activities to take place. Correct, incorrect and partial student responses are automatically generated, as well as expected responses on behalf of the artificial intelligence-based tutor. A right, wrong or partial answer in a dialog can be answered in multiple ways making the possible flows non-deterministic. A simulated student can also ask the tutor a question which the tutor can answer, and based on the answer, it suggests one or more recommended questions. Other possibilities also exist.

In a further aspect, the expected responses generated on behalf of the artificial intelligence-based tutor are evaluated by obtaining actual answers from the artificial intelligence-based tutor based on, for instance, simulating the conversation in the artificial intelligence-based tutor, and comparing the expected responses with the actual responses. The comparison results may be used to determine the accuracy of the conversation, and therefore, the level of training of the artificial intelligence-based tutor. For instance, if the results are within a select threshold, the level of training is considered acceptable or mastered. Other examples are possible.

In yet a further aspect, a report is generated and may be used to further train and/or evaluate the artificial intelligence-based tutor. Other possibilities also exist.

To train and/or evaluate an artificial intelligence-based tutor, an evaluation system is used, in accordance with one or more aspects of the present invention. One example of such an evaluation system used to train and/or evaluate an artificial intelligence-based tutor is described with reference to FIG. 1.

Referring to FIG. 1, in one example, an evaluation system 100 includes a number of components, including, for instance, a conversation generator 110 that has access to content 102 used to train and/or evaluate an artificial intelligence-based tutor 160. Content 102 includes, but is not limited to, question and answer pairs and at least selected text book portions. It may also include other information and/or data.

Conversation generator 110 is a component/service that generates sets of conversations (e.g., all possible sets) following certain predefined flows and scenarios. As one example, conversation generator 110 includes a rule engine 112 that stores the certain predefined flows and scenarios. The predefined flows and scenarios are based on material to be learned, such as a portion of a text book, etc. Rule engine 112 may be modified to include additional, fewer and/or different flows and/or scenarios to further train and/or evaluate the artificial intelligence-based tutor. This provides flexibility.

Conversation generator 110 generates conversation including questions, simulated student responses, and/or expected responses to the student responses. The simulated student responses are automatically generated and include, for instance, correct answers and different variants, a partially correct answer, an incorrect answer, a student question and/or a variant of a student question. In one example, questions and answers may be generated using information retrieval and natural language processing. A search may be performed of one or more knowledge bases, including online, web-based data, and/or training data sets, to provide answers to questions. Further, the system can automatically predict a future question. Prediction of future questions and possible responses can improve training and evaluation of the artificial intelligence-based tutor.

In one example, to automatically generate the simulated student responses, conversation generator 110 includes various components including, for instance, a correct answer and answer variant generator 114, a partial answer generator 116, an incorrect answer generator 118, a tutor response generator 120, a tutor next activity generator 122 and a student question and question variant generator 124, each of which is described below.

Correct answer and answer variant generator 114 generates a correct answer from a trained data set on which the tutor is trained or from a test data set. The data set used for training is broken into train and test data sets by a particular ratio (e.g., 70:30) and the expectation is that the tutor should be able to respond correctly in both cases.

To generate variants of a correct answer, in one example, a key word in the reference answer is identified and replaced with a synonym without changing the actual intent to evaluate whether the tutor can understand it as a correct answer. Further, in one example, one or more words in a sentence are intentionally modified to an incorrect spelling to check whether the tutor can auto correct them. Other possibilities are also possible.

Figure 2:
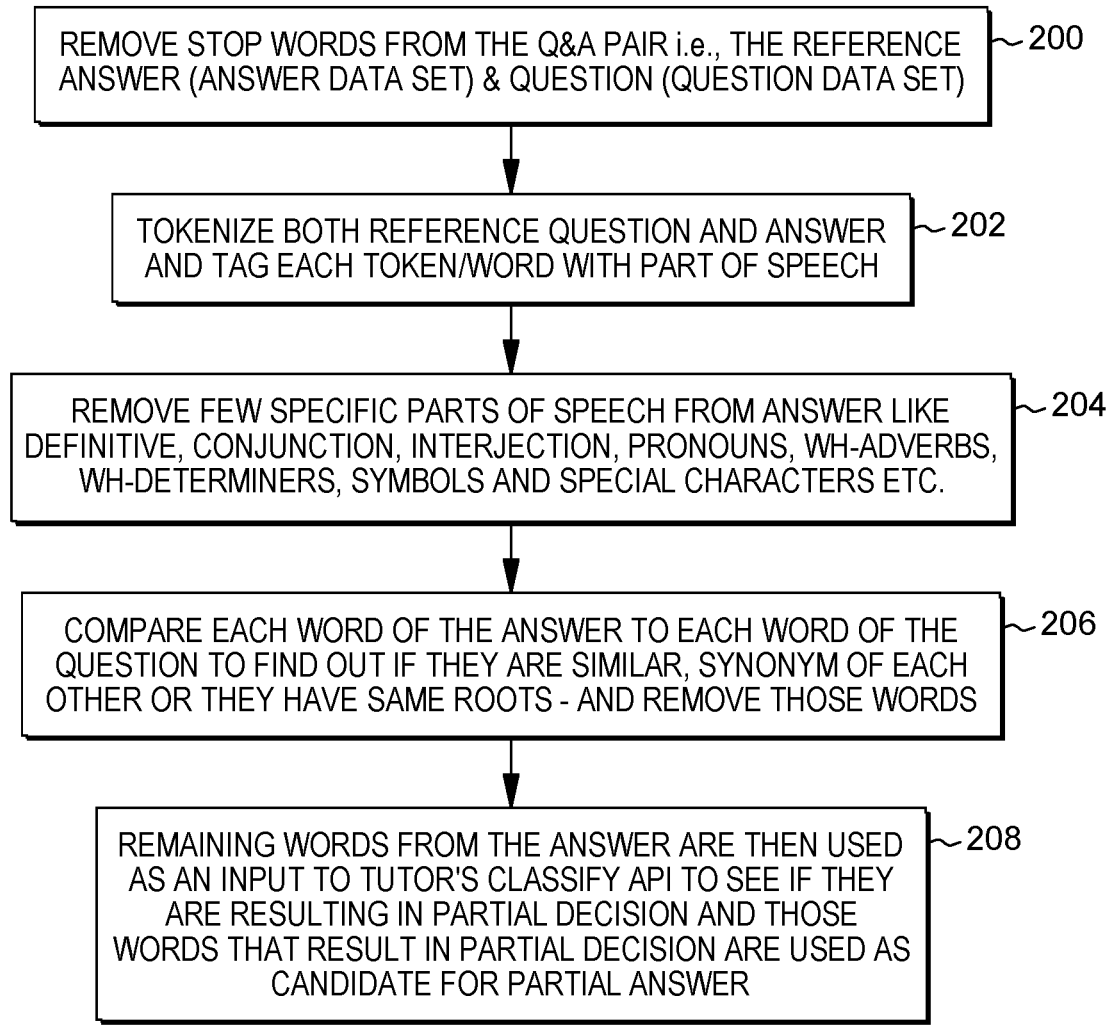
FIG. 2 depicts one example of a partial answer generation process used by the evaluation system of FIG. 1, in accordance with an aspect of the present invention.

In addition to generating a correct response, as described above, partial answer generator 116 may generate a partial answer to a question being asked (e.g., a partial response is automatically generated for a simulated question provided by the evaluator). One embodiment of generating a partial response is described with reference to FIG. 2.

In one embodiment, one or more stop words are removed from a question and answer pair (e.g., the reference answer from the answer data set and a question from the question data set), STEP 200. The stop words may include commonly used words, such as the, is, at, which, on or any other selected words. In another embodiment, stop words are not removed.

Additionally, both the reference question and answer are tokenized, and each token is tagged with a part of speech, STEP 202. That is, the question and answer (absent the stop words) are decomposed into the individual words (referred to as tokens) and each is assigned a tag indicating the part of speech, e.g., verb, noun, pronoun, adverb, etc. A few specific parts of the speech are removed from the answer, STEP 204. For instance, definitive, conjunction, interjection, pronouns, wh-adverbs, wh-determiners, symbols and special characters are examples of parts of speech to be removed. Wh- refers to a set of words beginning with wh-, such as when, where, and why, as examples.

Each word of the answer is compared with each word of the question (or selected words) to determine whether they are similar, a synonym of each other or if they have the same roots, and if so those words are removed, STEP 206.

The remaining words from the answer are used as an input to the tutor's classify application programming interface (API) (e.g., IBM Watson's classify API) to determine whether there is a partial decision, STEP 208. Those words that result in a partial decision are used as a candidate for a partial answer.

Returning to FIG. 1, incorrect answer generator 118 generates an incorrect answer by, for instance, selecting an answer from the same domain that is, however, an answer to a different question having a predefined word overlap (e.g., 0%) with the actual trained answer. One embodiment of calculating word overlap is described with reference to FIG. 3.

Figure 3:
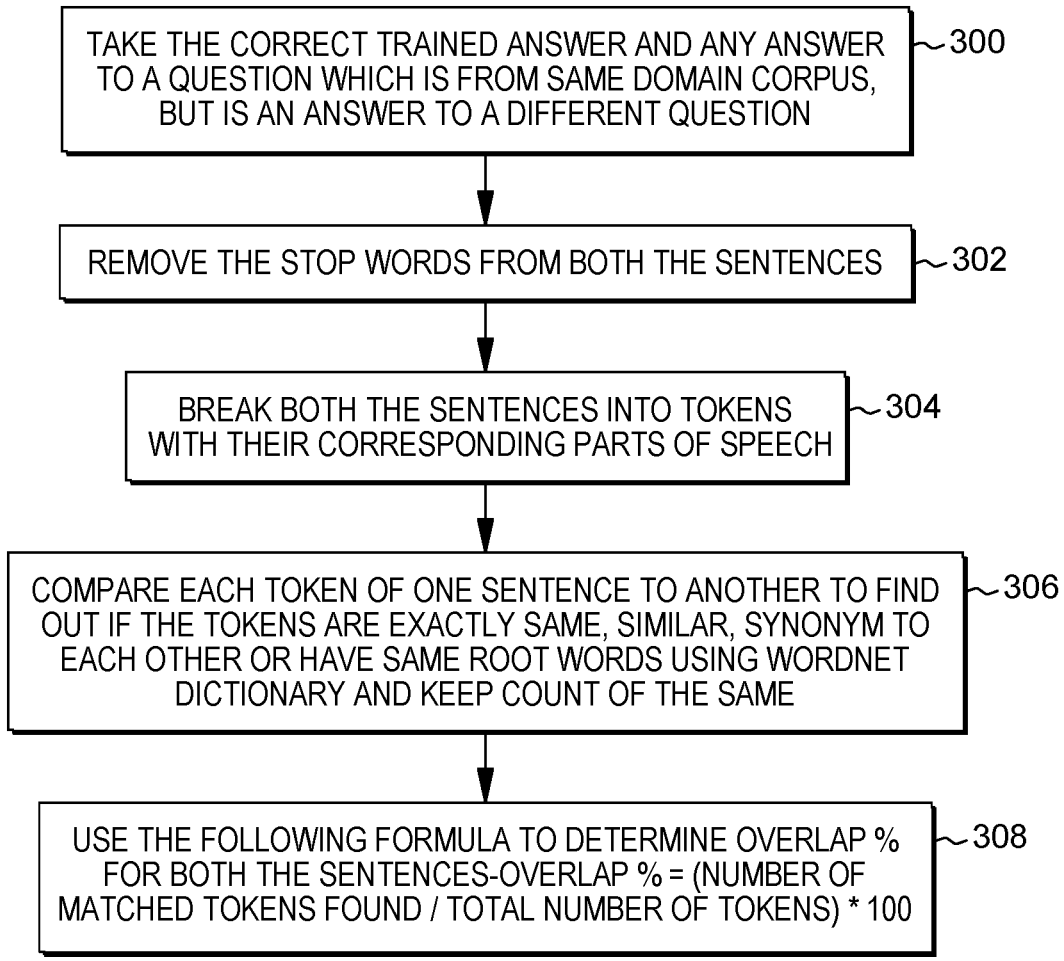
FIG. 3 depicts one example of a word overlap determination process used by the evaluation system of FIG. 1, in generating an incorrect answer, in accordance with an aspect of the present invention.

Referring to FIG. 3, in one example, the correct trained answer and an answer to a question which is from the same domain corpus, but is an answer to a different question, are selected, STEP 300. The stop words are removed from both the sentences (e.g., answers), in one example, STEP 302. The sentences are broken into tokens with their corresponding parts of speech, STEP 304.

Each token of one sentence is compared with tokens of another sentence (or select tokens are compared) to determine whether the tokens are exactly the same, similar, synonymous to each other or have the same root words using, for instance, a wordnet dictionary, STEP 306. A count of those words is performed.

A selected formula is used to determine an overlap percentage for both the sentences, STEP 308. One example formula includes: Overlap %=(Number of matched tokens (e.g., count found in STEP 306)/Total number of tokens) *100.

If, in one example, the overlap % is, e.g., 0%, then an incorrect answer is being generated. Other percentages and/or thresholds may also be used.

Returning to FIG. 1, tutor response generator 120 and tutor next activity generator 122 respond in many ways during the conversation. Based on inputs from a simulated student, as an example, the tutor can respond by, for instance, giving feedback, giving a correct answer, asking a next question, generating a task, such as filling in the blanks, an example true and false evaluation task, a concept grouping task or recommending a question, as examples. The system can auto generate each of these tutor activities based on the rules defined in the rule engine. The system can be trained on any possible set of new rules by injecting the rules in the rule engine.

Student question and question variant generator 124 generates one or more questions from a set of questions and question variants on which the tutor is being trained. As an example, a set of questions following certain patterns, such as starting with "what is", or questions that are asking for quantification, such as starting with "how many", etc., is used to automatically generate a question. For these cases, in one example, a key word is extracted, and another question is formed using the key word having conveyed the same meaning. Other possibilities also exist.

In one embodiment, conversation generator 110 is coupled to orchestrator 130, which facilitates processing of evaluation system 100 by providing the automatically generated conversation to a conversation simulator and assessor 140 and by providing evaluation reports 150.

Conversation simulator and assessor 140 obtains, via, e.g., orchestrator 130, the generated conversation output from conversation generator 110, and inputs it to artificial intelligence-based tutor 160 to simulate the generated conversation in artificial intelligence-based tutor 160. Based on the simulation, actual responses are generated. Thus, in one example, conversation simulator and assessor 140 is further responsible for obtaining and checking the actual tutor responses against the expected responses generated by conversation generator 110 and for indicating if there are any discrepancies. In embodiments, any discrepancies, discrepancies over a certain threshold, and/or certain types of discrepancies are reported. Other variations are possible.

Based on the assessment, and in particular, the indication of discrepancies, orchestrator 130 generates a tutor evaluation report 150. This report is used to perform one or more tasks, including, for instance, providing information regarding performance of artificial intelligence-based tutor 160, re-training the tutor, providing information regarding a student, using the generated information to update the tutor (e.g., automatically through training and learning), etc.

In one example, misclassified student inputs are identified and further used to retrain the artificial intelligence-based tutor. It facilitates quick turnaround for evaluating the quality of the tutor whenever the tutor is trained on a new piece of content or retrained on the existing content with some changes in training data. The cognitive capability of conversation generator 110 enables it to train the service on as many possible combinations of paths as possible and that helps uncover more issues with the tutor that was not even possible with actual interaction. The automated solution helps reduce the manual effort of evaluating the artificial intelligence-based tutor after training by more than, e.g., 95%.

As described herein, in one example, an evaluation capability, including, but not limited to, an evaluation system, is provided to automatically and dynamically train and/or evaluate an artificial intelligence-based tutor (e.g., artificial intelligence-based tutor 160). A conversation to be simulated by the artificial intelligence-based tutor is automatically generated. The conversation relates, e.g., to typical scenarios of question and answer dialogues that can happen between a student and the tutor. Several scenarios involving dialogues that take multiple turns are generated, in one example. The conversation takes one or more dialogue flows which are simulated by the rules. The results of the simulated conversation are used, in one example, as feedback to retrain the artificial intelligence system and/or tutor.

Figure 4A:
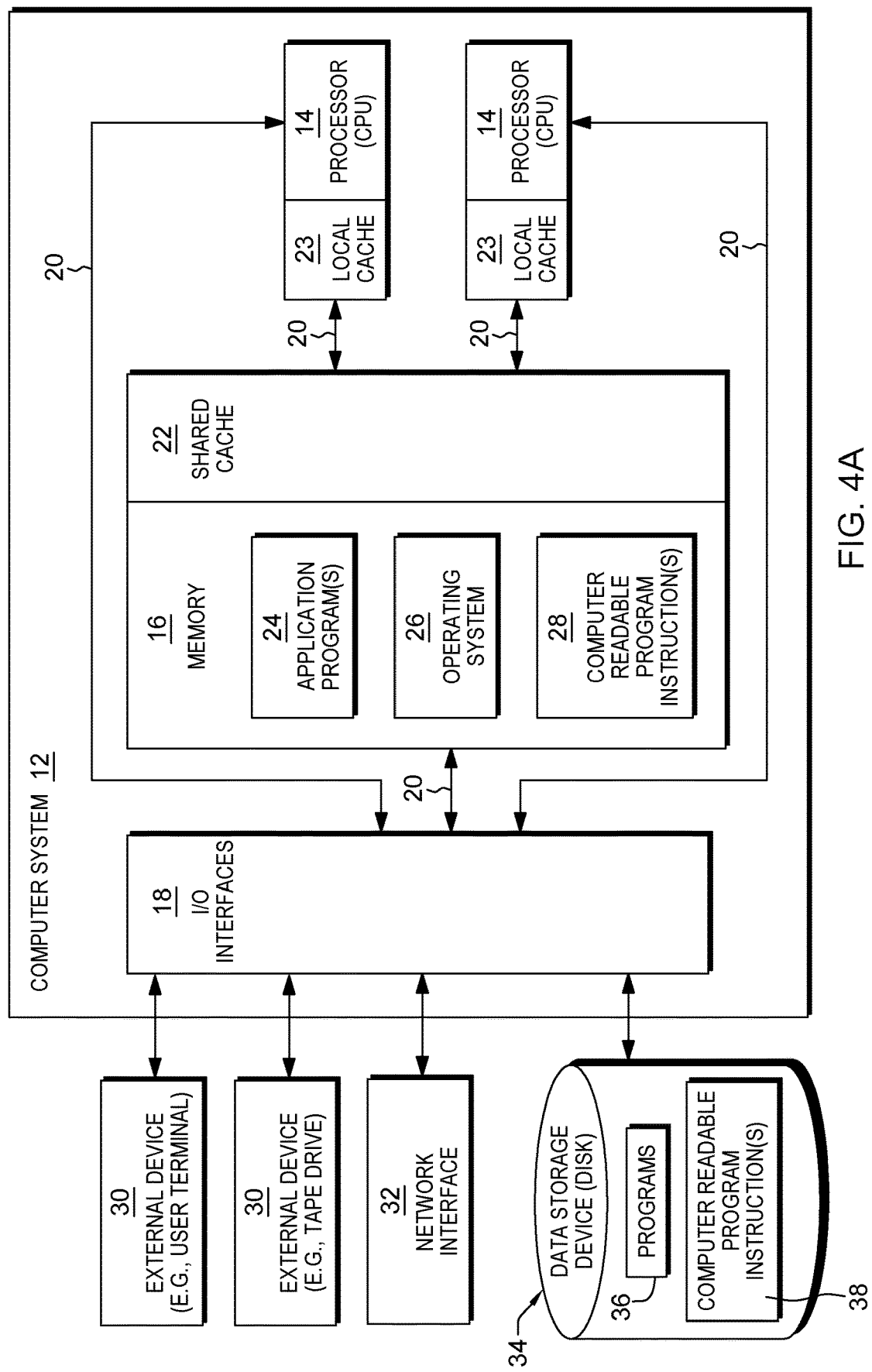
FIG. 4A depicts one example of a computing environment to incorporate and use one or more aspects of the present invention.

One or more components (e.g., generators and/or other components) of the evaluation system are implemented on and/or use one or more processors. One example of processors that may be used in one or more aspects, including an example environment that may include the processors, are described with reference to FIG. 4A. Referring to FIG. 4A, one example of a computer system that includes processors that may be used by one or more aspects of the present invention is described. In this example, the computer system is part of a computing environment including additional components that may or may not be used by aspects of the present invention.

As shown in FIG. 4A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, including one or more data storage devices 34, and/or one or more network interfaces 32. Other example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples include, but are not limited to: microcode, device drivers, redundant processing units, external disk drive arrays, RAID systems, tape drives, and data archival storage systems, etc.

Computer system 12 may be operational with numerous other general-purpose or special-purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more of the generators (e.g., one or more generators of conversation generator 110) and/or one or more other components (e.g., orchestrator 130, and/or conversation simulator and assessor 140) to perform one or more aspects of the present invention. These generators/components may be stored in memory, including main memory (e.g., memory 16) and/or one or more caches (e.g., shared cache 22, local cache 23) and/or external storage (e.g., device 34), and may be executed by one or more processors (e.g., processor 14). The processor may be part of a computer system, such as computer system 12, or part of a computing environment, such as computing environment 10, or may be separate therefrom. Many variations are possible.

Figure 4B:
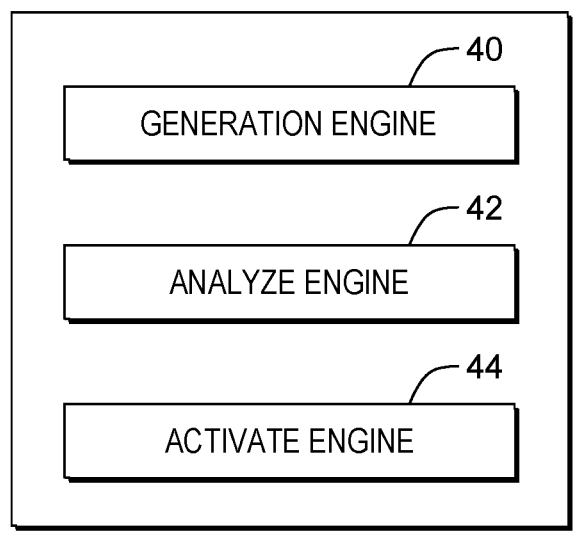
FIG. 4B depicts further details of one example of a processor of the computing environment of FIG. 4A, in accordance with an aspect of the present invention.

In one example, as shown in FIG. 4B, a processor, such as processor 14, includes a plurality of engines, each of which performs one or more aspects of the invention. For instance, processor 14 includes a generation engine 40 used to automatically generate a conversation for simulation by an artificial intelligence-based tutor; an analyze engine 42 to analyze results of a simulation of the conversation to determine whether the artificial intelligence-based tutor is performing as expected; and an activate engine 44 to take one or more actions based on the analysis. Each engine is further described below. Although various engines are described, aspects of the invention may be performed by one or more of the engines. There may be additional, fewer and/or different engines used to perform one or more aspects of the present invention.

Generation engine 40 includes one or more generators, such as conversation generator 110 (including the generators used by conversation generator 110), to automatically generate the conversation for simulation by the artificial intelligence-based tutor.

Analyze engine 42 includes one or more components, such as conversation simulator and assessor 140, to assess whether the artificial intelligence-based tutor is performing as expected. For instance, the expected responses that are automatically generated are compared to actual responses of the artificial intelligence-based tutor during simulation or otherwise to determine any inconsistencies.

Activate engine 44 includes one or more components, such as orchestrator 130, that performs one or more actions based on the assessment. For instance, one or more reports may be generated, such as tutor evaluation report 150. These reports may be used to update and/or improve the artificial intelligence-based tutor. Further actions may include, for instance, automatically updating the artificial intelligence-based tutor and/or providing updates (e.g., automatically) to the conversation generator, such as rule engine 112. Other possibilities also exist.

In accordance with an aspect of the present invention, cognitive technology and/or machine learning is used in one or more aspects to train and/or evaluate the artificial intelligence-based tutor.

As an example, machine learning is used to generate conversation, such as questions, answers, and/or other responses, and to evaluate the conversation with respect to what is being learned. Machine learning algorithms generate and train algorithms to create a model utilized to train and/or evaluate the artificial intelligence-based tutor. For instance, in an initialization stage, program code (e.g., hardware and/or software) trains these algorithms, based on, for instance, patterns and/or other data.

Figure 5:
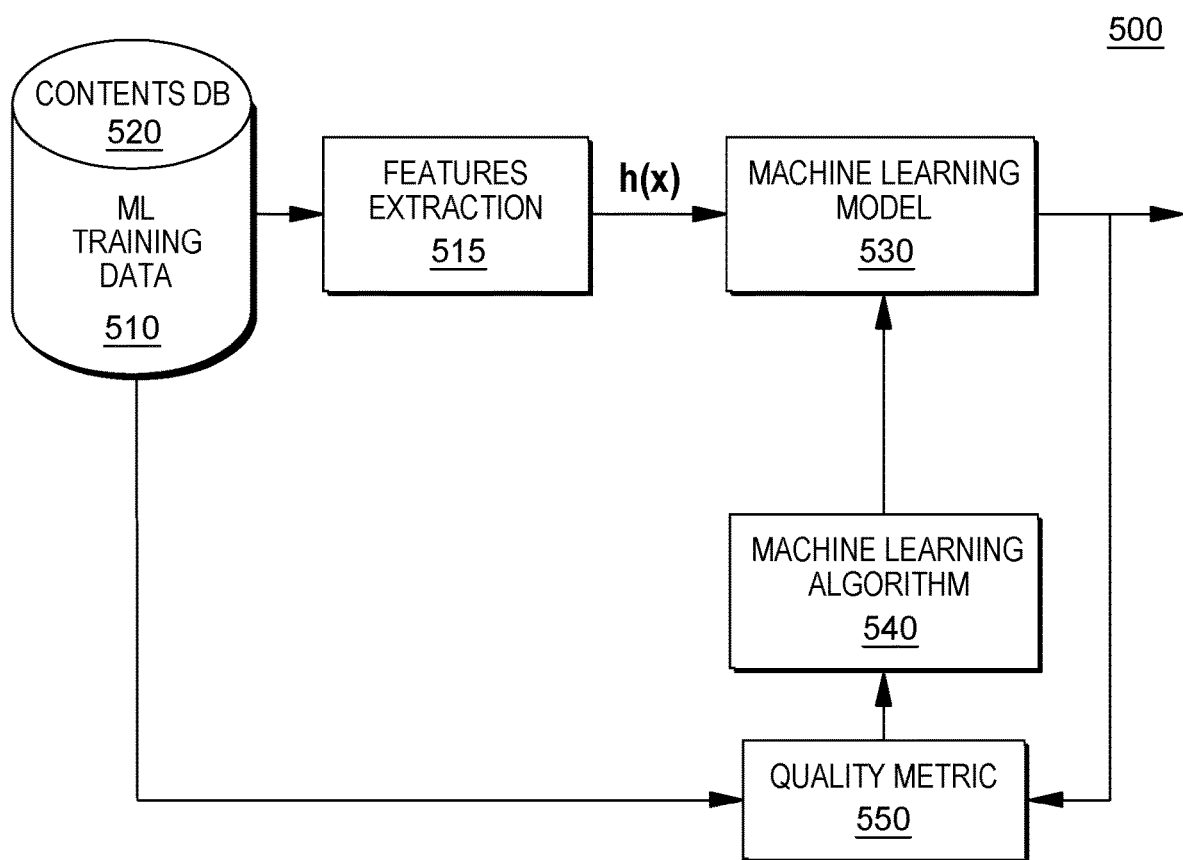
FIG. 5 depicts one example of using machine learning in one or more aspects of the present invention.

FIG. 5 is an example of a machine learning training system 500 utilized, in one or more aspects, to perform cognitive analyses of various inputs, including training data, test data, generated conversation and/or other data. Training data utilized to train the model in one or more embodiments of the present invention includes, for instance, data that is specific to what is being learned. The program code in embodiments of the present invention performs a cognitive analysis to generate data structures, including algorithms utilized by the program code to make predictions, such as to predict questions/responses. Machine learning (ML) solves problems that are not solved with numerical means alone. In this ML-based example, program code extracts various features/attributes/data from ML training data 510 (e.g., information collected from various data sources relevant to the training), which may be resident in one or more databases 520 comprising subject-related data and general data. Features extraction 515 is utilized to develop a predictor function, h(x), also referred to as a hypothesis, which the program code utilizes as a machine learning model 530.

In identifying various states and/or behaviors indicative of states in the ML training data 510, the program code can utilize various techniques including, but not limited to, mutual information, which is an example of a technique that can be utilized to identify features (e.g., elements, patterns, attributes, etc.). Further varying techniques may be used to select features, including but not limited to, diffusion mapping, principal component analysis, recursive feature elimination (a brute force approach to selecting features), and/or a Random Forest, to select the attributes related to various subject states (e.g., training/test data). The program code may utilize a machine learning algorithm 540 to train the machine learning model 530 (e.g., the algorithms utilized by the program code), including providing weights for the conclusions, so that the program code can train the predictor functions that comprise the machine learning model 530. The conclusions may be evaluated by a quality metric 550. By selecting a diverse set of ML training data 510, the program code trains the machine learning model 530 to identify and weight various attributes (e.g., features, patterns, data) that correlate to various states of a subject (e.g., student, tutor, etc.).

The model generated by the program code is self-learning as the program code updates the model based on active feedback received from subjects (e.g., students, the tutor and/or other input). For example, when the program code determines that there is material to be learned and/or questions and/or answers that were not previously predicted by the model, the program code utilizes a learning agent to update the model to reflect that information, in order to improve predictions in the future. Additionally, when the program code determines that a prediction is incorrect, either based on receiving user feedback through an interface or based on continuously monitoring the subject, the program code updates the model to reflect the inaccuracy of the prediction for the given period of time. Program code comprising a learning agent cognitively analyzes the data deviating from the modeled expectations and adjusts the model in order to increase the accuracy of the model, moving forward.

In one or more embodiments, program code executing on one or more processors, utilizes an existing cognitive analysis tool or agent to tune the model, based on data obtained from the various data sources. One or more embodiments utilize, for instance, the IBM Watson® system as the cognitive agent; however, other cognitive agents may be used. In one or more embodiments, the program code interfaces with, e.g., IBM Watson application programming interfaces (APIs) to perform a cognitive analysis of obtained data.

In one or more embodiments, the program code trains aspects of one or more IBM Watson application program interfaces (APIs) to learn the material being taught. Utilizing an existing cognitive agent, such as the IBM Watson system, expands the type of subject data that the program code can integrate into the model. For example, data can include documentary, text, visual, and audio data, which the program code can process, based on its utilization of the IBM Watson system. Specifically, in one or more embodiments, certain of the APIs of the IBM Watson system comprise a cognitive agent (e.g., learning agent) that includes one or more programs, including, but not limited to, natural language classifiers, Retrieve and Rank (i.e., a service available through the IBM Watson® Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson application program interfaces (APIs) can also provide audio related API services, in the event that the collected data includes audio, which can be utilized by the program code, including but not limited to natural language processing, text to speech capabilities, and/or translation.

In one or more embodiments, the program code utilizes a neural network to analyze the collected, learned and/or generated data to generate the model utilized to train and/or evaluate the artificial intelligence-based tutor. Neural networks are a biologically-inspired programming paradigm which enable a computer to learn from observational data, learned data, generated data, and/or other data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., states) in data (i.e., neural networks are non-linear statistical data modeling or decision-making tools). In general, program code utilizing neural networks can model complex relationships between inputs and outputs and identify patterns in data and to generate conversation and/or evaluate such conversation. Because of the speed and efficiency of neural networks, especially when parsing multiple complex data sets, neural networks and deep learning provide solutions to many problems in multiple source processing, which the program code in one or more embodiments accomplishes when obtaining data and generating a model for evaluation and/or training of artificial intelligence-based processes, such as artificial intelligence-based tutors.

One or more embodiments may utilize a neural network (NN) to predict future states of a given subject (e.g., predict future questions/responses). Utilizing the neural network, the program code can predict the likelihood of the given state at a subsequent time. The program code obtains (or derives) data related to the subject and/or content being learned from various sources to generate an array of values (possible states) to input into input neurons of the NN. Responsive to these inputs, the output neurons of the NN produce an array that includes the predicted states. The program code can automatically transmit notifications related to the predicted states based on the perceived validity.

In one or more embodiments, a neuromorphic processor or trained neuromorphic chip can be incorporated into the computing resources executing the program code. One example of a trained neuromorphic chip that is utilized in an embodiment of the present invention is the IBM® TrueNorth Chip™, produced by International Business Machines Corporation™.

The IBM TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million ($2^{28}$). Memory, computation, and communication are handled in each of the 4096 neurosynaptic cores, so TrueNorth circumvents the von-Neumann-architecture bottlenecks and is very energy-efficient.

One or more aspects of the present invention are inextricably tied to computing and improve the technical fields of artificial intelligence, including artificial intelligence-based tutors, and/or machine learning, as examples. Technological improvements are provided in automatically training and evaluating an artificial intelligence-based tutor to improve learning.

Although many examples and embodiments are provided herein, other variations and embodiments are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
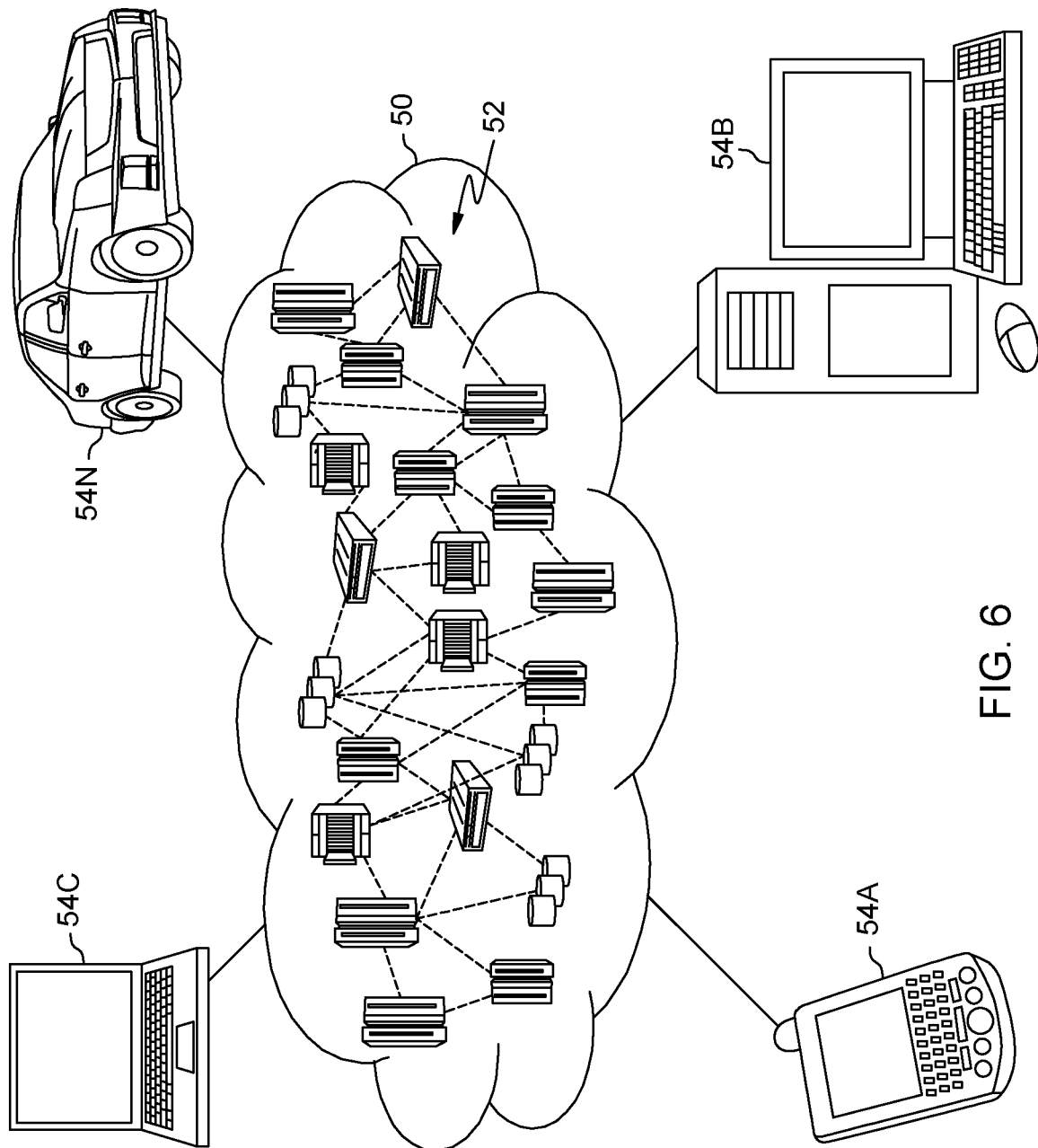
FIG. 6 depicts one embodiment of a cloud computing environment.

Referring now to FIG. 6, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
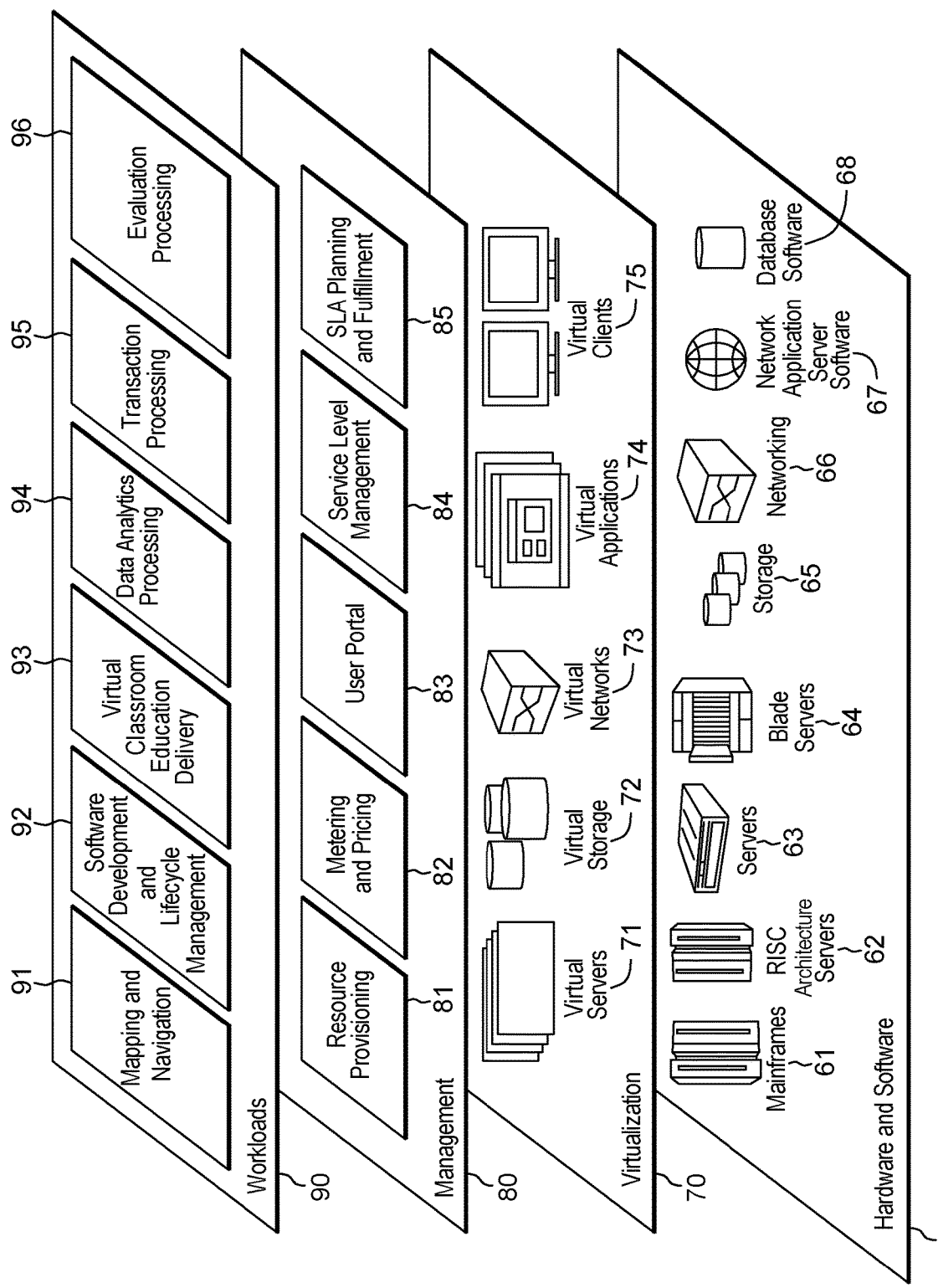
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides idsubject verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of generators and/or components, etc. may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   providing an artificial intelligence-based evaluation system to evaluate an artificial intelligence-based tutor, the artificial intelligence-based evaluation system:
   automatically generating a conversation for simulation by the artificial intelligence-based tutor, the conversation regarding content on which the artificial intelligence-based tutor is being trained, and wherein the automatically generating the conversation by the artificial intelligence-based evaluation system uses natural language processing, and comprises automatically generating inputs from a simulated student regarding the content, and automatically generating on behalf of the artificial intelligence-based tutor expected responses to the inputs automatically generated from the simulated student;
   providing the conversation as an output to be input to the artificial intelligence-based tutor for simulation by the artificial intelligence-based tutor; and
   automatically evaluating the expected responses to determine whether the artificial intelligence-based tutor is performing as expected, wherein the automatically evaluating the expected responses comprises comparing the expected responses with actual responses from simulating the conversation by the artificial intelligence-based tutor to determine whether the artificial intelligence-based tutor is performing as expected.

2. The computer-implemented method of claim 1, wherein the inputs automatically generated from the simulated student include a correct response, an incorrect response and a partial response to one or more questions based on the content.

3. The computer-implemented method of claim 2, wherein the expected responses automatically generated on behalf of the artificial intelligence-based tutor include expected responses to the correct response, the incorrect response and the partial response.

4. The computer-implemented method of claim 1, wherein the inputs automatically generated from the simulated student comprise a partial response to a question based on the content, and wherein the automatically generating the partial response comprises:
- tokenizing the question and an answer to the question to provide one or more words of the question and one or more words of the answer;
- removing one or more selected parts of speech from the answer;
- comparing the one or more words of the question with the one or more words of the answer to determine whether at least one word is to be removed from the answer;
- removing, based on the comparing, the at least one word from the answer; and
- generating the partial response based on remaining words of the answer.

5. The computer-implemented method of claim 4, wherein the automatically generating the partial response comprises removing one or more stop words from the question and the answer.

6. The computer-implemented method of claim 1, wherein the inputs automatically generated from the simulated student comprise an incorrect response to a question based on the content, and wherein the automatically generating the incorrect response comprises selecting an answer to a different question that is from a same domain as a correct answer to the question, wherein the answer to the different question has a selected amount of word overlap with the correct answer.

7. The computer-implemented method of claim 6, further comprising determining an amount of word overlap, wherein the determining the amount of word overlap comprises:
- tokenizing the answer to the different question and the correct answer to provide one or more tokens of the answer and one or more tokens of the correct answer;
- comparing the one or more tokens of the answer and the one or more tokens of the correct answer to determine a count of words that are the same, similar and synonymous; and
- using the count to determine the amount of word overlap.

8. The computer-implemented method of claim 7, further comprising using the amount of word overlap that is determined to determine whether the answer to the different question has the selected amount of word overlap.

9. The computer-implemented method of claim 1, further comprising taking action based on the automatically evaluating, wherein the taking action comprises generating an evaluation report to be used to train the artificial intelligence-based tutor.

10. The computer-implemented method of claim 1, wherein the artificial intelligence-based evaluation system is included within the artificial intelligence-based tutor.

11. The computer-implemented method of claim 1, wherein the artificial intelligence-based evaluation system is operatively coupled to the artificial intelligence-based tutor.

12. A system comprising:
- a memory; and
- a processor coupled to the memory, the processor configured to perform a method, the method comprising:
  - providing an artificial intelligence-based evaluation system to evaluate an artificial intelligence-based tutor, the artificial intelligence-based evaluation system;
  - automatically generating a conversation for simulation by the artificial intelligence-based tutor, the conversation regarding content on which the artificial intelligence-based tutor is being trained, and wherein the automatically generating the conversation by the artificial intelligence-based evaluation system uses natural language processing, and comprises automatically generating inputs from a simulated student regarding the content, and automatically generating on behalf of the artificial intelligence-based tutor expected responses to the inputs automatically generated from the simulated student;
  - providing the conversation as an output to be input to the artificial intelligence-based tutor for simulation by the artificial intelligence-based tutor; and
  - automatically evaluating the expected responses to determine whether the artificial intelligence-based tutor is performing as expected, wherein the automatically evaluating the expected responses comprises comparing the expected responses with actual responses from simulating the conversation by the artificial intelligence-based tutor to determine whether the artificial intelligence-based tutor is performing as expected.

13. The system of claim 12, wherein the inputs automatically generated from the simulated student include a correct response, an incorrect response and a partial response to one or more questions based on the content.

14. The system of claim 13, wherein the expected responses automatically generated on behalf of the artificial intelligence-based tutor include expected responses to the correct response, the incorrect response and the partial response.

15. A computer program product comprising:
- at least one non-transitory computer readable storage medium readable by a processing circuit and storing instructions for performing a method comprising:
  - providing an artificial intelligence-based evaluation system to evaluate an artificial intelligence-based tutor, the artificial intelligence-based evaluation system;
  - automatically generating a conversation for simulation by the artificial intelligence-based tutor, the conversation regarding content on which the artificial intelligence-based tutor is being trained, and wherein the automatically generating the conversation by the artificial intelligence-based evaluation system uses natural language processing, and comprises automatically generating inputs from a simulated student regarding the content, and automatically generating on behalf of the artificial intelligence-based tutor expected responses to the inputs automatically generated from the simulated student;
  - providing the conversation as an output to be input to the artificial intelligence-based tutor for simulation by the artificial intelligence-based tutor; and
  - automatically evaluating the expected responses to determine whether the artificial intelligence-based tutor is performing as expected, wherein the automatically evaluating the expected responses comprises comparing the expected responses with actual responses from simulating the conversation by the artificial intelligence-based tutor to determine whether the artificial intelligence-based tutor is performing as expected.

16. The computer program product of claim 15, wherein the inputs automatically generated from the simulated student include a correct response, an incorrect response and a partial response to one or more questions based on the content.

17. The computer program product of claim 15, wherein the expected responses automatically generated on behalf of the artificial intelligence-based tutor include expected responses to the correct response, the incorrect response and the partial response.

\* \* \* \* \*